(12) United States Patent
Sadeghi et al.

(10) Patent No.: US 9,628,568 B2
(45) Date of Patent: *Apr. 18, 2017

(54) APPARATUS, SYSTEM AND METHOD OF SUPPORTING STREAMING OVER A PROTOCOL ADAPTATION LAYER (PAL)

(71) Applicant: INTEL CORPORATION, Santa Clara, CA (US)

(72) Inventors: Bahareh Sadeghi, Portland, OR (US); Rafal Wielicki, Gdansk (PL); Marek Dabek, Gdansk (PL); Elad Levy, Rishon LeZion (IL)

(73) Assignee: INTEL CORPORATION, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/998,069

(22) Filed: Dec. 24, 2015

(65) Prior Publication Data

US 2016/0212217 A1    Jul. 21, 2016

Related U.S. Application Data

(63) Continuation of application No. 14/129,298, filed as application No. PCT/US2013/060051 on Sep. 17, 2013, now Pat. No. 9,374,402.

(Continued)

(51) Int. Cl.
*H04L 29/08* (2006.01)
*H04L 29/06* (2006.01)
(Continued)

(52) U.S. Cl.
CPC ........ *H04L 67/141* (2013.01); *H04L 65/1069* (2013.01); *H04L 65/4069* (2013.01);
(Continued)

(58) Field of Classification Search
CPC ....... H04L 67/141; H04L 69/08; H04L 69/18; H04L 65/1069; H04L 65/4069;
(Continued)

(56) References Cited

U.S. PATENT DOCUMENTS

2006/0179144 A1  8/2006  Nagase
2009/0034498 A1  2/2009  Banerjea et al.
(Continued)

FOREIGN PATENT DOCUMENTS

JP    2011501483    1/2011
JP    2011512577    4/2011

OTHER PUBLICATIONS

Wireless Gigabit Alliance (WGA) Specifications; WiGig MAC and PHY Specification Version 1.1, Apr. 2011—Final Specification; 442 pages.
(Continued)

*Primary Examiner* — Thai Nguyen
(74) *Attorney, Agent, or Firm* — Shichrur & Co.

(57) ABSTRACT

Some demonstrative embodiments include apparatuses, systems and/or methods of supporting streaming over a Protocol Adaptation Layer (PAL). For example, an apparatus may include a first PAL communication unit to communicate PAL traffic with a second PAL communication unit over a communication link, the PAL traffic comprising traffic of a PAL connection, over a PAL, between a first device and a second device, the PAL is above a layer of the communication link, the PAL traffic comprising data to be communicated between the first device and one or more endpoints via the second device, wherein the first PAL communication unit is to communicate an endpoint open stream request and an endpoint open stream response with the second PAL communication unit over the communication link.

22 Claims, 3 Drawing Sheets

Related U.S. Application Data

(60) Provisional application No. 61/824,065, filed on May 16, 2013.

(51) Int. Cl.
*H04W 76/00* (2009.01)
*H04W 92/18* (2009.01)
*H04W 76/02* (2009.01)

(52) U.S. Cl.
CPC .............. *H04L 69/08* (2013.01); *H04L 69/18* (2013.01); *H04W 76/00* (2013.01); *H04W 76/021* (2013.01); *H04W 76/022* (2013.01); *H04W 92/18* (2013.01)

(58) Field of Classification Search
CPC . H04W 76/021; H04W 76/00; H04W 76/022; H04W 92/18
See application file for complete search history.

(56) References Cited

U.S. PATENT DOCUMENTS

| | | |
|---|---|---|
| 2009/0094506 A1 | 4/2009 | Lakkis |
| 2009/0198859 A1 | 8/2009 | Orishko et al. |
| 2010/0130138 A1 | 5/2010 | Nandagopalan et al. |
| 2011/0097999 A1 | 4/2011 | Hansen et al. |
| 2011/0158145 A1 | 6/2011 | Gong et al. |
| 2011/0173351 A1 | 7/2011 | Aull et al. |
| 2012/0063376 A1 | 3/2012 | Kambhatla et al. |
| 2013/0013823 A1 | 1/2013 | Altmayer |
| 2013/0282938 A1 | 10/2013 | Huang et al. |
| 2014/0344463 A1 | 11/2014 | Sadeghi et al. |

OTHER PUBLICATIONS

IEEE Std 802.11™-2012. IEEE Standard for Information technology—Telecommunications and information exchange Between systems Local and metropolitan area networks—Specific requirements Part 11: Wireless LAN Medium Access Control (MAC) and Physical Layer (PHY) Specifications, Mar. 29, 2012, 2793 pages.
IEEE Std 802.11ad™-2012. IEEE Standard for Information technology—Telecommunications and information 3xchange between systems Local and metropolitan area networks—Specific requirements Part 11: Wireless LAN Medium Access Control (MAC) and Physical Layer (PHY) Specifications Amendment 3: Enhancements for Very High Throughput in the 60 GHz Band, Dec. 28, 2012, 628 pages.
Wi-Fi Alliance Technical Committee P2P Task Group; Wi-Fi Peer-to-Peer (P2P) Technical Specification; Version 1.2; Dec. 14, 2011; 160 pages.
Universal Serial Bus Specification, Revision 1.0, Jan. 15, 1996, 268 pages.
Universal Serial Bus Specification, Revision 2.0, Apr. 27, 2000, 650 pages.
International Preliminary Report on Patentability and Written Opinion for International Patent Application No. PCT/US2013/060051, mailed on Nov. 26, 2015, 8 pages.
International Search Report and Written Opinion for PCT Patent Application no. PCT/US2013/060051, mailed on Feb. 25, 2014, 12 pages.
Office Action for U.S. Appl. No. 14/129,298, mailed on Oct. 26, 2015, 18 pages.
Universal Serial Bus 3.0 Specification, Revision 1.0, Jun. 6, 2011, 531 pages.
WiGig White Paper Defining the Future of Multi-Gigabit Wireless Communications, Jul. 2010, 5 pages.
Office Action for Korean Patent Application Serial No. 2015-7029960, mailed on Jun. 20, 2016, 5 pages. (Including 2 pages of English translation).
Search Report for European Patent Application No. 13884638.1 mailed on Nov. 14, 2016, 7 pages.
Office Action for Japanese Patent Application No. 2016-507530, mailed on Dec. 6, 2016, 11 pages. (Including 5 pages of English translation).

US 9,628,568 B2

APPARATUS, SYSTEM AND METHOD OF SUPPORTING STREAMING OVER A PROTOCOL ADAPTATION LAYER (PAL)

CROSS REFERENCE

This application claims the benefit of and priority from U.S. Provisional Patent application No. 61/824,065 entitled "Support of USB streaming protocol in media-agnostic USB solutions", filed May 16, 2013, the entire disclosure of which is incorporated herein by reference.

TECHNICAL FIELD

Embodiments described herein generally relate to supporting streaming over a Protocol Adaptation Layer (PAL).

BACKGROUND

Some wireless communication technologies may be configured for communication of various dedicated services.

For example, the Wireless-Gigabit (WiGig) technology, e.g., according to the *Wireless Gigabit Alliance, Inc WiGig MAC and PHY Specification Version* 1.1, April 2011, *Final specification*, is designed to carry multiple dedicated services, such as audio-visual (A/V) and input output (I/O).

The WiGig Alliance (WGA) has defined a set of Protocol Abstraction Layers (PALs), e.g., a WiGig Serial Extension (WSE) PAL and a WiGig Display Extension (WDE) PAL, that standardize the method of transporting traffic of specific industry-standard protocols, e.g. Universal Serial Bus (USB) and DisplayPort, over the WiGig media access control (MAC) layer. Other PALs may be defined with respect to other communication links, e.g., Wireless Fidelity (WiFi) links.

The WSE defines a WSE host communicating with a WSE device over a WiGig wireless link interface. The WSE host can connect and control several WSE devices. Each WSE device can include several USB ports, and each USB port can be attached to a USB device or be extended to several ports via a USB hub.

Since USB devices and/or USB hosts may be configured for communicating over a physical medium, e.g., a USB cable, there may be a problem to perform some operations, e.g., in an efficient seamless and/or transparent manner, via the WSE PAL.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DESCRIPTION OF EMBODIMENTS

Figure 1:
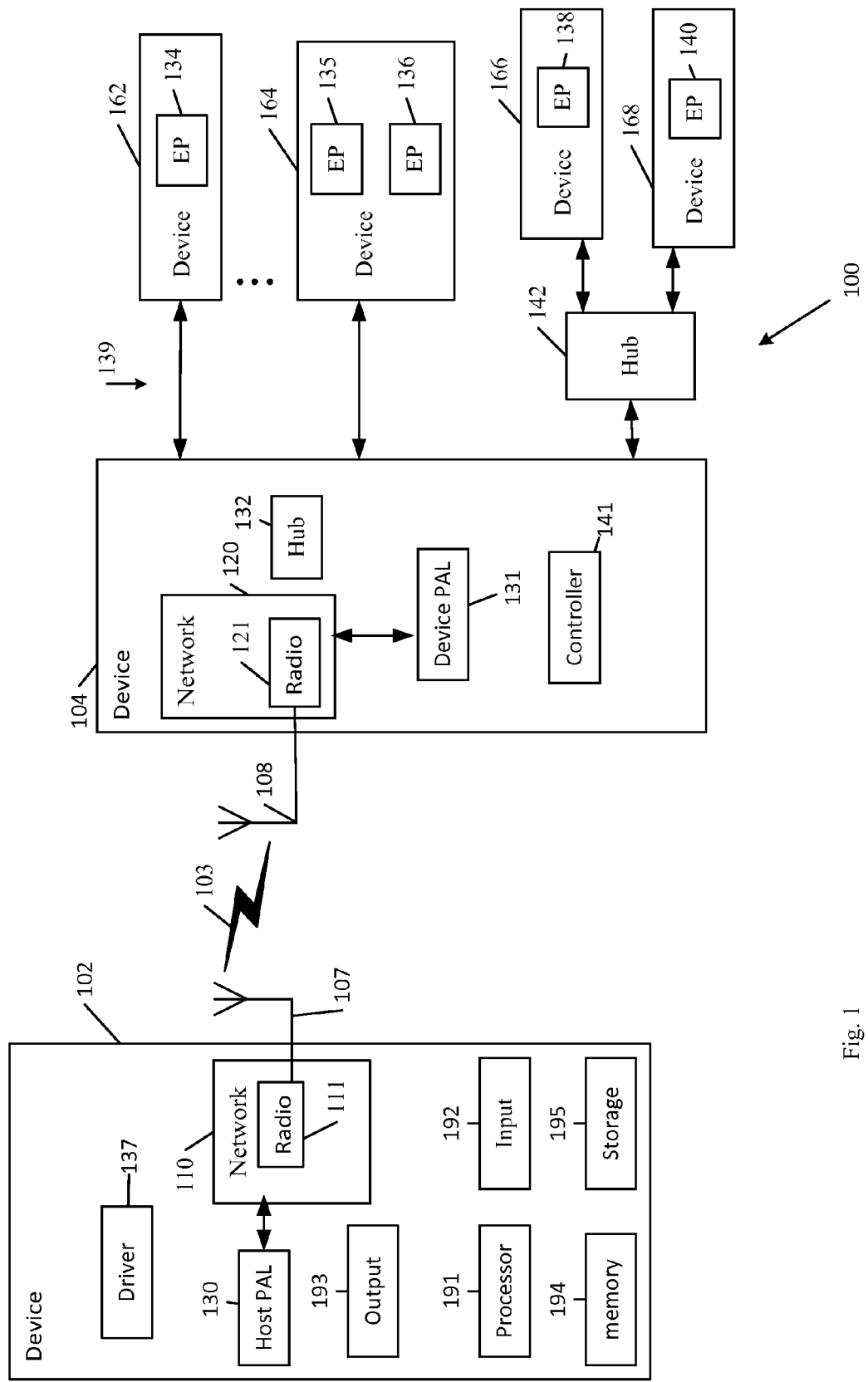
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment," "an embodiment," "demonstrative embodiment," "various embodiments," etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Wireless-Gigabit-Alliance (WGA or WiGig) specifications (*Wireless Gigabit Alliance, Inc WiGig MAC and PHY Specification Version* 1.1, April 2011, *Final specification*) and/or future versions and/or derivatives thereof, devices and/or networks operating in accordance with existing WiGig Serial Extension (WSE) protocols (*WiGig Serial Extension (WSE) Specification Draft* 1.02, August 2012) and/or future versions and/or derivatives thereof, devices and/or networks operating in accordance with existing WiGig Display Extension (WDE) protocols (*WDE Draft Specification* 1.04, August 2012) and/or future versions and/or derivatives thereof, devices and/or networks operating in accordance with existing WiGig Bus Extension (WBE) protocols (*WiGig Bus Extension Spec (WBE), Version* 1.0 June 2011) and/or future versions and/or derivatives thereof, devices and/or networks operating in accordance with existing WiGig Secure Digital (SD) Extension (WSD) protocols (*WiGig SD Extension (WSD) PAL Specification Draft* 1.0 August 2012) and/or future versions and/or derivatives thereof, devices and/or networks operating in accordance with existing Bulk Only Transfer (BOT) Protocols (*Universal Serial Bus (USB) Mass Storage Class Bulk-Only Transport, Revision* 1.0, Sep. 31, 1999) and/or future versions and/or derivatives thereof, devices and/or networks operating in accordance with existing Wireless Fidelity (WiFi) Alliance (WFA) Peer-to-Peer (P2P) specifications (*WiFi P2P technical specification, version* 1.3, 2012) and/or future versions and/or derivatives thereof, devices and/or networks operating in accordance with existing WiFi Serial Bus (WSB) specifications and/or future versions and/or derivatives thereof, devices and/or networks operating in accordance with existing IEEE 802.11 standards (*IEEE 802.11-2012, IEEE Standard for Information technology—Telecommunications and information exchange between systems Local and metropolitan area networks—Specific requirements Part* 11*: Wireless LAN Medium Access Control (MAC) and Physical Layer (PHY) Specifications*, Mar. 29, 2012; IEEE802.11 task group ac (TGac) ("*IEEE*802.11-09/ 0308*r*12—*TGac Channel Model Addendum Document*"); *IEEE* 802.11 *task group ad (TGad)* (*IEEE P*802.11*ad/D*9.0 *Draft Standard for Information Technology—Telecommunications and Information Exchange Between Systems—Local and Metropolitan Area Networks—Specific Requirements— Part* 11*: Wireless LAN Medium Access Control (MAC) and Physical Layer (PHY) Specifications—Amendment* 5*: Enhancements for Very High Throughput in the* 60 *GHz Band*)), and/or future versions and/or derivatives thereof, devices and/or networks operating in accordance with existing IEEE 802.16 standards (*IEEE-Std* 802.16, 2009 *Edition, Air Interface for Fixed Broadband Wireless Access Systems; IEEE-Std* 802.16*e*, 2005 *Edition, Physical and Medium Access Control Layers for Combined Fixed and Mobile Operation in Licensed Bands; amendment to IEEE Std* 802.16-2009*, developed by Task Group m*) and/or future versions and/or derivatives thereof, devices and/or networks operating in accordance with existing WirelessHD™ specifications and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), WiGig, Wi-Fi, Internet-Protocol (IP), Wi-Max, ZigBee™, Ultra-Wideband (UWB), Global System for Mobile communication (GSM), 3rd Generation Partnership Project (3GPP), 2G, 2.5G, 3G, 3.5G, Long Term Evolution (LTE), LTE advanced, Fifth Generation (5G) mobile networks, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit.

Some demonstrative embodiments may be used in conjunction with suitable limited-range or short-range wireless communication networks, for example, a wireless area network, a "piconet", a WPAN, a WVAN and the like. Other embodiments may be used in conjunction with any other suitable wireless communication network.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmwave) frequency band), e.g., a frequency band within the frequency band of between 30 Ghz and 300 GHZ, a WLAN frequency band, a WPAN frequency band, a frequency band according to the WGA specification, a WiFi band, a P2P band, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/ receive elements. The antenna may include, for example, a phased array antenna, a single element antenna, a set of switched beam antennas, and/or the like.

The term "station" (STA), as used herein, may include any logical entity that is a singly addressable instance of a medium access control (MAC) and a physical layer (PHY) interface to a wireless medium (WM).

The phrase "access point" (AP), as used herein, may include an entity that contains one station (STA) and provides access to distribution services, via the WM for associated STAs.

The term "beamforming", as used herein, may relate to a spatial filtering mechanism, which may be used at a transmitter and/or a receiver to improve the received signal power or signal-to-noise ratio (SNR) at an intended receiver.

The phrase "non-access-point (non-AP) station (STA)", as used herein, may relate to a STA that is not contained within an AP.

The phrases "directional multi-gigabit (DMG)" and "directional band" (DBand), as used herein, may relate to a frequency band wherein the Channel starting frequency is above 40 GHz.

The phrases "DMG STA" and "mmWave STA (mSTA)" may relate to a STA having a radio transmitter, which is operating on a channel that is within the DMG band.

The phrase "peer to peer (PTP or P2P) communication", as used herein, may relate to device-to-device communication over a wireless link ("peer-to-peer link") between a pair of devices. The P2P communication may include, for example, wireless communication over a direct link within a QoS basic service set (BSS), a tunneled direct-link setup (TDLS) link, a STA-to-STA communication in an independent basic service set (IBSS), or the like.

A wireless P2P wireless communication network ("P2P network" or "P2P group") may include a plurality of wireless communication devices capable of supporting device-to-device communication.

The phrase "Protocol Adaptation Layer (PAL)", as used herein, may include an abstraction layer configured to enable transporting traffic of at least one predefined protocol over a communication link. The predefined protocol may include, for example, a specific industry-standard protocol, e.g. USB, DisplayPort, and the like. The PAL may be above a layer of the communication link. For example, the PAL may be above a data link layer, for example, a MAC layer, and/or above a transport layer, e.g., a Transmission Control Protocol (TCP) or User Datagram Protocol (UDP), which is above the data link layer.

In one example, the data link layer may include, for example, a MAC layer of a wireless link, e.g., a WiFi MAC layer, a WiGig MAC layer, a P2P MAC layer, and the like. In another example, the PAL may be above a transport layer, e.g., a TCP or UDP, which may be configured for transporting traffic over an IP network, e.g., a wired or wireless Internet link and/or Ethernet link.

Some demonstrative embodiment are described herein with respect to a PAL connection over a wireless communication link, for example, a WiGig link or a WiFi link, e.g., as described below. However, other embodiments may include a PAL connection over any other wired or wireless communication link, e.g., an IP link.

The phrase "PAL communication unit", as used herein, may include a communication element to manage a PAL connection between a first architectural element, for example, a PAL host, e.g., a USB host, and a second architectural element, for example, a PAL device, e.g., a USB device, over a communication link, e.g., a MAC layer link or a transport layer link, between the PAL communication unit and another PAL communication unit. For example, a first PAL communication unit may communicate PAL traffic with a second PAL communication unit over a communication link. The PAL traffic may include traffic of a PAL connection, over a PAL, between first and second devices, e.g., a host device and a USB device.

In some demonstrative embodiments, the PAL communication unit (also referred to as "PAL manager" or "PAL controller") may perform the functionality of, may include, or may be implemented as part of a service set, for example, a WSE Service Set (WSS) or a Media-Agnostic (MA) USB Service Set (MASS). For example, the PAL communication unit may perform at least part of the functionality of a MA-USB device, a WSE device, a MA-USB host or a WSE host, e.g., as described below. In other embodiments, the PAL communication unit may perform the functionality of any other PAL device, element and/or module.

The phrases "MA-USB device" and "WSE device", as used herein, may include, for example, a MA-USB or WSE architectural element that integrates, and/or is associated with, at least one device, e.g., a USB device, and manages transfers, e.g., USB transfers, targeting the integrated device over a network connection. In one example, the integrated device may be connected, for example, through a wired USB, e.g., USB cable, USB chip-to-chip interconnect, and/any other technologies. For example, the integrated device may be presented through the MA-USB device or WSE device to a host as a USB device compliant with a USB specification, e.g., the USB 2.0 and/or USB 3.0 Specifications.

In one example, the MA-USB device may optionally include any computing platform, e.g., a portable device, which houses and/or performs the functionality of the MA-USB device and, optionally, one or more additional elements, e.g., drivers and/or application software, configured to perform the functionality of a peripheral device. In other embodiments, the MA-USB device may include and/or may be implemented by any other portable or non-portable device.

In some demonstrative embodiments, the MA-USB device may include USB device logic, e.g., for communicating with a USB device according to a USB Specification, a MA-USB device PAL, e.g., to control communication over the PAL, and a network interface, e.g., to communicate over the communication link. For example, the MA-USB device PAL may interface between the USB device logic and the network interface, e.g., in a transparent manner. In other embodiments, the MA-USB device may include any other elements. In one example, the PAL communication unit may perform the functionality of at least the MA-USB device PAL.

The phrases "MA-USB host" and "WSE host", as used herein, may include an architectural element of the MA-USB PAL or WSE PAL that includes a communication architecture, e.g., a WiGig or WiFi MAC and PHY, and USB host logic, e.g., as defined by a USB specification, e.g., the USB 2.0 and/or USB 3.0 Specifications.

In one example, the MA-USB host or WSE host may optionally include any computing platform, e.g., a personal computer, which houses and/or performs the functionality of the MA-USB host or WSE host and, optionally, one or more additional elements, e.g., drivers and/or application software, configured to perform the functionality of a host device. In other embodiments, the MA-USB host or WSE host may include and/or may be implemented by any other portable or non-portable device.

In some demonstrative embodiments, the MA-USB host may include USB host logic, e.g., for communicating with a USB host according to a USB Specification, a MA-USB host PAL, e.g., to control communication over the PAL, and a network interface, e.g., to communicate over the communication link. For example, the MA-USB host PAL may interface between the USB host logic and the network interface, e.g., in a transparent manner. In other embodiments, the MA-USB host may include any other elements. In one example, the PAL communication unit may perform the functionality of at least the MA-USB host PAL.

An endpoint may include, for example, an architectural element, which is associated with a first device, which in turn is configured to interface between the endpoint and a second device over a communication link. For example, the endpoint may be integrated as part of the first device or connected to the first device via one or more other devices and/or connections. The endpoint may be implemented, for example, using any technology, e.g., software, hardware and/or any combination thereof. The first device may include and/or interface between one or more endpoints and the second device.

In one example, the first device may include a MA-USB device and the second device may include a MA-USB host. For example, the endpoint may belong to a USB device, e.g., a USB device, which may be integrated into the MA-USB device or connected, e.g., through a wired USB connection, to the MA-USB device, e.g., via a hub integrated into the MA-USB device.

According to this example, the endpoint may be uniquely identified by the MA-USB host. For example, a combination of a MA-USB device address of the MA-USB device and a MA-USB EP handle assigned to the endpoint may uniquely identify a USB device endpoint within a MA-USB service set.

In other examples, the first and second devices may include any other, e.g., non-MA-USB, non-WSE and/or non-USB, device and the endpoint may perform the functionality of any other, e.g., non-USB, non-MA-USB and/or non-WSE, element.

Reference is now made to FIG. 1, which schematically illustrates a block diagram of a system 100, in accordance with some demonstrative embodiments.

As shown in FIG. 1, in some demonstrative embodiments, system 100 may include a communication network including one or more communication devices, e.g., devices 102 and/or 104, capable of communicating content, data, information and/or signals over a communication medium, for example, a radio channel, an IR channel, a RF channel, a Wireless Fidelity (WiFi) channel, and the like. One or more elements of system 100 may optionally be capable of communicating over any suitable wired communication links.

In some demonstrative embodiments, devices 102 and/or 104 may include, for example, a PC, a desktop computer, a mobile computer, a laptop computer, a notebook computer, a tablet computer, an Ultrabook™, a server computer, a media center, a mobile internet device, a handheld computer, a handheld device, a storage device, a mass storage device, a USB mass storage (UMS) device, a hard drive, an optical drive, a flash memory device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, devices 102 and/or 104 may include network interfaces 110 and 120, respectively, to perform communication over a communication network between communication devices 102 and 104 and/or with one or more other devices, e.g., as described below.

Devices 102 and/or 104 may also include, for example, one or more of a processor 191, an input unit 192, an output unit 193, a memory unit 194, and a storage unit 195. Devices 102 and/or 104 may optionally include other suitable hardware components and/or software components. In some demonstrative embodiments, some or all of the components of one or more of devices 102 and/or 104 may be enclosed in a common housing or packaging, and may be interconnected or operably associated using one or more wired or wireless links. In other embodiments, components of one or more of communication devices 102 and/or 104 may be distributed among multiple or separate devices.

Processor 191 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of communication devices 102 and/or 104 and/or of one or more suitable applications.

Input unit 192 includes, for example, a keyboard, a keypad, a mouse, a touch-screen, a touch-pad, a track-ball, a stylus, a microphone, or other suitable pointing device or input device. Output unit 193 includes, for example, a monitor, a screen, a touch-screen, a flat panel display, a Cathode Ray Tube (CRT) display unit, a Liquid Crystal Display (LCD) display unit, a plasma display unit, one or more audio speakers or earphones, or other suitable output devices.

Memory unit 194 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by communication devices 102 and/or 104.

In some demonstrative embodiments, network interfaces 110 and/or 120 may include wireless communication units, e.g., including radios 111 and 121, to communicate over a wireless communication medium. For example, radios 111 and/or 121 may include, or may be associated with, one or more antennas 107 and/or 108, respectively. Antennas 107 and/or 108 may include any type of antennas suitable for transmitting and/or receiving wireless communication signals, blocks, frames, transmission streams, packets, messages and/or data. For example, antennas 107 and/or 108 may include any suitable configuration, structure and/or arrangement of one or more antenna elements, components, units, assemblies and/or arrays. Antennas 107 and/or 108 may include, for example, antennas suitable for directional communication, e.g., using beamforming techniques. For example, antennas 107 and/or 108 may include a phased array antenna, a single element antenna, a set of switched beam antennas, and/or the like. In some embodiments, antennas 107 and/or 108 may implement transmit and receive functionalities using separate transmit and receive antenna elements. In some embodiments, antennas 107 and/or 108 may implement transmit and receive functionalities using common and/or integrated transmit/receive elements.

In some demonstrative embodiments, radios 111 and/or 121 may include one or more wireless transmitters, receivers and/or transceivers able to send and/or receive wireless communication signals, RF signals, frames, blocks, transmission streams, packets, messages, data items, and/or data. For example, radios 111 and/or 121 may include or may be implemented as part of a wireless Network Interface Card (NIC), and the like.

In some demonstrative embodiments, devices 102 and 104 may establish a communication link 103. Link 103 may be configured for communication over a data link layer, e.g., the MAC layer, a logical link control (LLC) and/or a transport layer.

In some demonstrative embodiments, link 103 may include an uplink and/or a downlink. For example, the uplink may include a link for communicating data from device 104 to device 102, and/or the downlink may include a link for communicating data from device 102 to device 104.

In one example, the downlink may include, for example, a unidirectional link from an AP to one or more non-AP stations (STAs) or a unidirectional link from a non-AP Destination STA to a non-AP Source STA. The uplink may include, for example, a unidirectional link from a non-AP STA to an AP or a unidirectional link from a non-AP Source STA to a non-AP Destination STA.

In some demonstrative embodiments, link 103 may include a wireless communication link, for example, a WiGig link, a WiFi link or a WLAN link, e.g., as described below.

In other embodiments, link 103 may include any other wireless or wired link, e.g., an IP link. According to these embodiments, network interfaces 110 and/or 120 may include any suitable communication unit, e.g., a wired or wireless communication unit, to communicate over the communication network.

In some demonstrative embodiments, devices 102 and 104 may form, or may be part of, a wireless communication network. The wireless communication network may include, for example, a P2P network or any other network.

In some demonstrative embodiments, devices 102 and/or 104 may perform the functionality of DMG stations ("DMG STA"). For example, communication devices 102 and/or 104 may be configured to communicate over the DMG band.

In some demonstrative embodiments, device 102 may include a mobile device and device 104 may include a docking device to connect device 102 to one or more other devices ("peripherals"), for example, including one or more USB devices, e.g., peripheral devices 162, 164, 166 and/or 168, and/or any other device.

For example, device 102 may include, or may be included as part of a mobile or portable device, for example, a mobile computer, a laptop computer, a notebook computer, a tablet computer, an Ultrabook™, a Smartphone, a handheld computer, a handheld device, a PDA device, a handheld PDA device, an on-board device, an off-board device, a hybrid device, e.g., combining cellular phone functionalities with PDA device functionalities, a consumer device, a vehicular device, a non-vehicular device, a cellular telephone, a PCS device, a PDA device which incorporates a wireless communication device, a mobile or portable GPS device, a relatively small computing device, a non-desktop computer, a CSLL device, a UMD, a UMPC, a MID, an "Origami" device or computing device, a device that supports DCC, a context-aware device, a video device, an audio device, an A/V device, a data source, a Digital Still camera (DSC), a media player, or the like.

In one example, device 104 may include a docking device configured to connect between device 102 and devices 162, 164, 166 and/or 168 via one or more interfaces 139, for example, serial interfaces, e.g., USB interfaces and/or any other interface. Devices 162, 164, 166 and/or 168 may include for example, a mass storage device, e.g., a USB mass storage (UMS) device, a hard drive, an optical drive, a flash memory device, and the like.

In some demonstrative embodiments, device 104 may be connected to devices 162, 164, 166 and/or 168 via one or more USB interfaces 139 supporting one or more data transfer rates. For example, device 104 may be connected to one or more of devices 162, 164, 166 and/or 168 via a first USB interface 139 supporting a first data transfer rate, e.g., a USB1.1 interface supporting a data transfer rate of 12 Mega bit per second (Mbps), device 104 may be connected to one or more of devices 162, 164, 166 and/or 168 via a second USB interface 139 supporting a second data transfer rate, e.g., a USB2 interface supporting a data rate of 480 Mbps, and/or device 104 may be connected to one or more of devices 162, 164, 166 and/or 168 via a third USB interface 139 supporting a third data transfer rate, e.g., a USB3 interface supporting a data transfer rate of up to 4.8 Giga bit per second (Gbps).

In some demonstrative embodiments, device 104 may include a hub 132, e.g., a USB hub, to connect between device 104 and one or more of devices 162, 164, 166 and 168. Additionally or alternatively, device 104 may be connected to one or more of devices 162, 164, 166 and 168 via any USB tree, which may include, for example, one or more USB hubs 142. For example, device 102 may include, or may be connected to, one or more USB ports, and each USB port may be connected to a USB device or be extended to several ports via USB hub 132 and/or USB hub 142.

In some demonstrative embodiments, devices 162, 164, 166 and/or 168 may perform the functionality of one or more Endpoints (EPs). For example, a USB device may perform the functionality of one EP or more than one EP. In one example, device 162 may perform the functionality of an EP 134, device 164 may perform the functionality of an EP 135 and an EP 136, device 166 may perform the functionality of an EP 138, and/or device 168 may perform the functionality of an EP 138.

In some demonstrative embodiments, device 102 may include a PAL communication unit 130, and device 104 may include a PAL communication unit 131. PAL communication units 103 and 131 may be configured to manage a PAL connection between devices 102 and 104 over link 103.

In some demonstrative embodiments, devices 102 and 104 may communicate over link 103 according to a WiGig protocol, a WiFi protocol, a WLAN protocol or any other wired or wireless protocol.

In some demonstrative embodiments, devices 102 and 104 may be configured for communication of various dedicated services. For example, the WiGig technology is designed to carry multiple dedicated services, such as audiovisual (A/V) and input output (I/O).

Some demonstrative embodiments are described herein with reference to communicating a data stream including USB data over a wireless communication link according to a MA-USB or WSE protocol. However, other embodiments may be implemented with respect to communicating any other suitable data over any other communication link, according to any other communication protocol and/or over any other layer or PAL.

In some demonstrative embodiments, device 102 may perform the functionality of a USB host and device 104 may perform the functionality of a USB device.

In some demonstrative embodiments, PAL communication unit 130 may perform the functionality of a MA-USB host or WSE host and PAL communication unit 131 may perform the functionality of a MA-USB device or WSE device.

In some demonstrative embodiments, PAL communication unit 130 may perform the functionality of a Wi-Fi Serial Bus (WSB) host and PAL communication unit 131 may perform the functionality of a WSB device.

In some demonstrative embodiments, PAL communication unit 130 may perform the functionality of a media-agnostic (MA) host and PAL communication unit 131 may perform the functionality of a MA device.

In some demonstrative embodiments, PAL communication units 130 and 131 may communicate PAL over communication link 131. The PAL traffic may include PAL traffic of a PAL connection, over a PAL, e.g., between devices 102 and 104.

In some demonstrative embodiments, PAL communication units 130 and 131 may communicate USB traffic over the PAL via link 103. The USB traffic may include, for example, non-periodic (NP) traffic, e.g., bulk and/or control traffic, and/or periodic traffic, e.g., Isochronous and/or Interrupt traffic, which may be communicated by the EPs 134, 135, 136, 138 and/or 140.

In some demonstrative embodiments, the USB traffic may include traffic ("USB IN") delivered from the EPs the EPs 134, 135, 136, 138 and/or 140, via device 104, to device 102, and/or traffic ("USB OUT") delivered from device 102, via device 104, to the EPs the EPs 134, 135, 136, 138 and/or 140.

In some demonstrative embodiments, the USB PAL may enable transport of USB data over media other than USB cable, for example, wireless links, e.g., Wi-Fi or WiGig links, or wired links, e.g., Ethernet. The USB PAL may directly interface with network interfaces 110 and 120, e.g., to replace a network layer in the Open Systems Interconnection (OSI) model, or may be an IP application, interfacing with an IP (e.g., TCP/IP or UDP/IP) stack.

In some demonstrative embodiments, PAL communication unit 130 and PAL communication unit 131 may be configured to enable media-agnostic connectivity of a PAL between devices 102 and 104.

In some demonstrative embodiments, PAL communication unit 130 and PAL communication unit 131 may be configured to enable connectivity of the PAL between devices 102 and 104 over a wireless communication link, for example, a WiGig link or WiFi link, e.g., as described below. However, in other embodiments, PAL communication unit 130 and PAL communication unit 131 may be configured to enable media-agnostic connectivity of the PAL between devices 102 and 104 over any other medium, for example, a WLAN link, an IP link, e.g., internet, Ethernet, over wire or wireless, a media-agnostic link, and the like.

In some demonstrative embodiments, PAL communication units 130 and 131 may be configured to interface, e.g., over link 103, between host logic, for example, a driver at a host platform, e.g., a device interface of device 102, and at least one peripheral controller 141 of device 104.

In some demonstrative embodiments, the at least one peripheral controller 141 may include a controller, which may be implemented, for example, to control one or more peripheral devices connected to the peripheral controller 141, e.g., peripheral devices 162, 164, 166 and/or 168.

In some demonstrative embodiments, the USB PAL may replace a USB physical cable.

For example, PAL communication units 130 and 131 may be configured to interface, e.g., over link 103, between USB host logic, for example, a USB driver at a host platform, e.g., a USB driver 137 of device 102, and at least one peripheral controller 141, for example, a USB controller ("USB host controller"), of device 104.

For example, peripheral controller 141 may include a USB controller, which may be implemented, for example, to control one or more USB devices connected to the USB controller 141, e.g., USB devices 162, 164, 166 and/or 168. USB controller 141 may be implemented by software, hardware, and/or any combination thereof. In one example, USB controller 141 may, for example, perform the functionality of an extensible Host Controller Interface (xHCI), e.g., in accordance with the USB 3.0 Specification.

According to this example, the combination of PAL communication unit 130, network interface 110, network interface 120, and PAL communication unit 131 may be configured to replace and/or emulate the USB physical cable for connecting between a host device, e.g., device 102, and a peripheral device, e.g., a USB device, for example, included by or connected to device 104.

In some demonstrative embodiments, PAL communication unit 130 and/or PAL communication unit 131 may be configured to communicate over a USB PAL between a USB host and a USB device. The USB PAL may enable efficient transport of USB traffic by transmitting USB transfers, as opposed to USB transactions. USB transfers may include larger pieces of data, which may be more appropriate for transmission over a communication link between devices 102 and 104, e.g., a wireless link.

In some demonstrative embodiments, in media agnostic USB (MA-USB), there may exist a PAL session, e.g., a wireless session, between PAL communication unit 130 and PAL communication unit 131, e.g., in addition to a USB specified session between the USB host logic of device 102 and every USB device under control of the USB host logic, e.g., devices 162, 164, 166 and/or 168.

In some demonstrative embodiments, PAL communication unit 130 may communicate with PAL communication unit 131 during a session ("MA-USB session" or "WSE session") between the MA-USB device and MA-USB host.

In some demonstrative embodiments, PAL communication unit 130 may perform host functions specific to media agnostic USB including, for example, creating PAL messages and interfaces with lower layers, e.g., transport, data link, and/or MAC layers. PAL communication unit 131 may be a counterpart of PAL communication unit 130, and may, for example, manage the interactions with the USB devices, e.g., which may be "behind" PAL communication unit 131.

In some demonstrative embodiments, data transfers ("transactions") between device 104 and EPs 134, 135, 136, 138 and/or 140 may be initiated by a host, e.g., by device 102. For example, driver 137 may be configured to transfer data between device 102 and EPs 134, 135, 136, 138 and/or 140, e.g., via device 104.

In some demonstrative embodiments, driver 137 may trigger an IN transfer, e.g., a "read" transaction for reading data from an EP.

In some demonstrative, driver 137 may trigger an OUT transfer, e.g., a "write" transaction for writing data from device 102 to an EP.

Some demonstrative embodiments are described herein with reference to communicating data streams including USB data over a wireless communication link according to a MA-USB protocol or WSE protocol. However, other embodiments may be implemented with respect to communicating any other suitable data over any other communication link, according to any other communication protocol and/or over any other layer or PAL.

In some demonstrative embodiments, PAL communication units 130 and/or 131 may be configured to support one or more USB functionalities and/or capabilities, e.g., in accordance with the USB 2.0 and/or 3.0 Specifications, for example, over the PAL session of the media-agnostic USB.

In some demonstrative embodiments, PAL communication units 130 and/or 131 may be configured to support streaming over the PAL, e.g., as described below.

In some demonstrative embodiments, PAL communication units 130 and/or 131 may be configured to support communication of multiple flows (streams) of data with an endpoint, e.g., in parallel. For example, PAL communication units 130 and/or 131 may be configured to support communication of a plurality of parallel streams between device 102 and an endpoint of endpoints 134, 135, 136, 138 and/or 140.

In one example, an endpoint of endpoints 134, 135, 136, 138 and/or 140, e.g., endpoint 138, may perform the functionality of a SuperSpeed (SS) bulk endpoint. For example, endpoint 138 may support a streaming protocol, e.g., according to the USB 3.0 Specification or any other Specification.

In some demonstrative embodiments, supporting communication of multiple parallel flows (streams) of data with endpoint 138 may enable, for example, increased efficiency and/or higher throughput.

In some demonstrative embodiments, a media-agnostic scheme may be required to support the streaming protocol, e.g., in order to enable efficient use of the streaming protocol between the host and the endpoint.

In some demonstrative embodiments, partial or basic support configurations for supporting the streaming protocol may not be efficient or sufficient. For example, enabling a MA-USB device, e.g., device 104, to communicate with a MA-USB host, e.g., device 102, a maximum number of streams the MA-USB device can support and/or communicating a stream identifier (ID) as part of data packets, may not enable efficient use of the streaming protocol. In one example, this partial support configuration may implicitly require maintaining a large memory space on the MA-USB device, e.g., to maintain state for the maximum number of streams supported by the MA-USB device. In another example, the partial support configuration may not be able to support specific functionalities and/or protocol messages, e.g., USB Driver Interface (USBDI) messages for setting up (opening) and/or dismantling (closing) streams.

In some demonstrative embodiments, PAL communication units 130 and/or 131 may be configured to communicate one or more messages to support streams for an endpoint, e.g., endpoint 138, as described below.

In some demonstrative embodiments, PAL communication units 130 and/or 131 may be configured to communicate one or more PAL messages to open and/or close streams for the endpoint, e.g., as described below.

In one example, PAL communication units 130 and/or 131 may be configured to communicate one or more USB PAL messages to enable a MA-USB host, e.g., device 102, to open and/or close streams on an endpoint, e.g., endpoint 138, for example, a bulk endpoint, "behind" a MA-USB device, e.g., device 104.

In some demonstrative embodiments, PAL communication unit 130 may communicate an endpoint open stream request and an endpoint open stream response with PAL communication unit 131 over communication link 103, e.g., as described below.

In some demonstrative embodiments, the endpoint open stream request may include an endpoint handle of an endpoint and a requested number of endpoint streams to be opened for the endpoint, e.g., as described below.

In some demonstrative embodiments, the endpoint open stream response may be communicated between PAL communication units 130 and 131 in response to the endpoint open stream request, e.g., as described below.

In some demonstrative embodiments, PAL communication unit 130 may transmit the open stream request to PAL communication unit 131 to request opening of one or more streams on an endpoint of endpoints 134, 135, 136, 138 and 140.

In some demonstrative embodiments, PAL communication unit 131 may receive the open stream request from PAL communication unit 131, and may transmit the open stream response to PAL communication unit 130, e.g., in response to the open stream request.

In some demonstrative embodiments, the open stream request and/or the open stream response may be communicated as part of first and/or second management packets, e.g., as described below.

In some demonstrative embodiments, an endpoint open streams request packet (also referred to as "EPOpenStreamReq") may be transmitted by a host, e.g., a WSE host or a MA-USB host, to a target device, e.g., a WSE device or a MA-USB device, to open streams on an SS bulk endpoint ("the targeted EP") on a USB device ("the targeted USB device") behind the target device.

In one example, PAL communication unit 130 may perform the functionality of the host, PAL communication unit 131 may perform the functionality of the target device, and endpoint 138 may perform the functionality of the SS bulk endpoint.

In some demonstrative embodiments, the open streams request packet may include a device handle field including a handle of a USB device targeted by the request, e.g., the USB device including the targeted EP.

For example, PAL communication unit 130 may transmit to PAL communication unit 131 an EPOpenStreamReq packet including a handle of USB device 166, e.g., to request to open streams on EP 138.

In some demonstrative embodiments, the endpoint open streams request packet may be transmitted as a management packet. For example, a type field of the endpoint open streams request packet may be set to a value, e.g., "0", indicating the endpoint open streams request packet is a management packet. A subtype field of the endpoint open streams request packet may be set, for example, to a value, e.g., "42", indicating the packet is an endpoint open streams request packet.

In some demonstrative embodiments, the endpoint open streams request packet may identify the targeted EP. For example, the endpoint open streams request packet may include an EP handle of the target EP.

In some demonstrative embodiments, the endpoint open streams request packet may indicate a requested number of endpoint streams to be opened for the target EP.

In some demonstrative embodiments, the requested number of endpoint streams may conform to a number of streams supported by wireless communication unit 131.

For example, the requested number of endpoint streams may be equal to or lesser than a supported number of streams, which may be indicated, for example, during a session establishment of a session between PAL communication units 130 and 131, e.g., as described below.

In some demonstrative embodiments, the endpoint open streams request packet may include, for example, the following fields, e.g., following a management header of the endpoint open streams request packet:

TABLE 1

| Width (bits) | Offset (DW:bit) | Description |
|---|---|---|
| 16 | 2:16 | EP Handle. Indicates the SS bulk endpoint the request is targeting. |
| 17 | 3:0 | Number of Streams. Indicates the number of streams to be opened for the target endpoint. |

In other embodiments, the endpoint open streams request may additionally or alternatively include any other fields and/or information and/or may have any other format.

In some demonstrative embodiments, an endpoint open streams response packet (also referred to as "EPOpenStreamResp") may be transmitted by the target device, for example, the WSE device or MA-USB device, e.g., PAL communication unit 131, to the host, for example, the WSE host or the MA-USB host, e.g., PAL communication unit 130. For example, the EPOpenStreamResp packet may be transmitted in response to the EPOpenStreamReq packet.

In some demonstrative embodiments, the open streams response packet may include a device handle field including a handle of the USB device targeted by the request, e.g., the USB device including the targeted EP.

For example, PAL communication unit 131 may transmit to PAL communication unit 130 an EPOpenStreamResp packet including the handle of USB device 166, e.g., in response to the open streams request packet requesting to open streams on EP 138.

In some demonstrative embodiments, the endpoint open streams response packet may be transmitted as a management packet. For example, a type field of the endpoint open streams response packet may be set to a value, e.g., "0", indicating the endpoint open streams response packet is a management packet. A subtype field of the endpoint open streams response packet may be set, for example, to a value, e.g., "43", indicating the packet is an endpoint open streams response packet.

In some demonstrative embodiments, the endpoint open stream response may include an indication on whether the endpoint open stream request is successfully completed.

In some demonstrative embodiments, the endpoint open stream response may include a field, e.g., a Status Code field, to carry a value indicating SUCCESS (NO_ERROR) or a value indicating ERROR in opening the requested streams for the endpoint.

In some demonstrative embodiments, the endpoint open stream response may include a number of streams opened for the target endpoint.

In one example, the endpoint open stream response may include a number of streams equal to the number of requested streams, as requested by the endpoint open stream request, e.g., if all requested streams are successfully opened.

In another example, the endpoint open stream response may include a number of streams lesser than the number of requested streams, as requested by the endpoint open stream request, e.g., if only some of the requested streams are successfully opened.

In some demonstrative embodiments, the endpoint open stream response may include a list of stream identifiers (Stream IDs) of streams opened for the target endpoint.

In some demonstrative embodiments, the stream identifiers may be arranged in increasing order.

In some demonstrative embodiments, if at least one requested stream is not opened for the endpoint, the endpoint open stream response may include at least one error code indicating a reason for not opening the at least one requested stream.

In some demonstrative embodiments, the endpoint open streams response packet may include, for example, the following fields, e.g., following a management header of the endpoint open streams response packet:

TABLE 2

| Width (bits) | Offset (DW:bit) | Description |
|---|---|---|
| 16 | 2:16 | Reserved. |
| 17 | 3:0 | Number of Streams. Indicates the number of streams that were successfully opened. If the Status Code field in the packet carries a value indicating SUCCESS (NO_ERROR) this field shall carry the same value as Number of Streams field in the corresponding EPOpenStreamReq packet. |
| 15 | 3:17 | Reserved. |
| Variable | 4:0 | Stream ID List. List of Stream IDs of the streams that were opened, concatenated in 16-bit increments in strict increasing order. The list is empty when no stream was successfully opened. |

In other embodiments, the endpoint open streams response may additionally or alternatively include any other fields and/or information and/or may have any other format.

In some demonstrative embodiments, a MA-USB host or WSE host, e.g., PAL communication unit 130, may open streams on a bulk endpoint, e.g., endpoint 138, for example, in order to use the SuperSpeed Stream Protocol of USB 3.0, or any other streaming protocol. For example, PAL communication unit 130 may open the streams on endpoint 138 by transmitting to a MA-USB device or a WSE device associated with the endpoint, e.g., PAL communication unit 131, an Endpoint Open Streams Request (EPOpenStreamReq) packet indicating the number of streams to be opened.

In some demonstrative embodiments, the MA-USB host or WSE host may ensure that the requested number of streams is supported by the MA-USB device or the WSE device. For example, PAL communication unit 130 may ensure that the requested number of streams is supported by PAL communication unit 131, based on an indication of the number of streams supported by PAL communication unit 131. The indication of the number of streams supported by PAL communication unit 131 may be communicated, for example, during a session establishment and/or as part of a capability exchange, e.g., as part of a Capability Response (CapResp) packet transmitted by PAL communication unit 131.

In some demonstrative embodiments, the MA-USB device or WSE device may respond to the EPOpenStreamReq packet with an Endpoint Open Streams Response (EPOpenStreamResp) packet, e.g., to inform the MA-USB host or WSE host whether the Endpoint Open Streams Request was successfully completed and to return the Stream IDs for the opened streams. For example, PAL communication unit 131 may transmit to PAL communication unit 130 the Endpoint Open Streams Response, e.g., as described above.

In some demonstrative embodiments, the MA-USB device may indicate that the number of streams requested by the host is greater than the number of streams supported by the MA-USB device, for example, by setting a status code field of the EPOpenStreamResp packet to a predefined value, e.g., an "INSUFFICIENT_RESOURCES" value.

In some demonstrative embodiments, PAL communication units 130 and 131 may be configured to close the streams opened for an EP, for example, when changing a number of open streams on the EP, changing a USB device configuration of a USB device including the EP, performing an action that requires the EP to cease operation, and/or performing any other operation.

In one example, a WSE host or MA-USB host may close the open streams of an EP, for example, if the WSE host or MA-USB host is to change the number of open streams on the endpoint, to change the USB device configuration, or to perform any other action that requires the endpoint to cease operation.

In some demonstrative embodiments, PAL communication units 130 and 131 may communicate an endpoint close stream request and an endpoint close stream response over communication link 103, for example, to close the streams opened by an EP, e.g., EP 138, as described below.

In some demonstrative embodiments, the endpoint close stream request may include the endpoint handle of the endpoint, e.g., as described below.

In some demonstrative embodiments, the endpoint close stream response may be communicated in response to the endpoint close stream request. The endpoint close stream response may, for example, indicate whether all open streams for the endpoint are successfully closed, e.g., as described below.

In some demonstrative embodiments, an endpoint close stream request packet (also referred to as "EPCloseStreamReq") may be transmitted by a host, for example, the WSE host or MA-USB host, e.g., PAL communication unit 130, to a target device, for example, the WSE device or the MA-USB device, e.g., PAL communication unit 131.

For example, the EPCloseStreamReq packet may be transmitted from the MA-USB host to the target MA-USB device to close streams on an SS bulk endpoint, e.g., EP 138, on a USB device under management of the target MA-USB device.

In some demonstrative embodiments, the close stream request packet may include a device handle field including a handle of the USB device targeted by the request, e.g., the USB device including the targeted EP.

For example, PAL communication unit 130 may transmit to PAL communication unit 131 an EPCloseStreamReq packet including the handle of USB device 166, e.g., to request to close streams on EP 138.

In some demonstrative embodiments, the endpoint close stream request packet may be transmitted as a management packet. For example, a type field of the endpoint close stream request packet may be set to a value, e.g., "0", indicating the endpoint close stream request packet is a management packet. A subtype field of the endpoint close stream request packet may be set, for example, to a value, e.g., "44", indicating the packet is an endpoint close stream request packet.

In some demonstrative embodiments, the endpoint close stream request packet may include, for example, the following fields, e.g., following a management header of the endpoint close stream request packet:

TABLE 3

| Width (bits) | Offset (DW:bit) | Description |
| --- | --- | --- |
| 16 | 2:16 | EP Handle. Indicates the SS bulk endpoint the request is targeting. |

In other embodiments, the endpoint close stream request packet may additionally or alternatively include any other fields and/or information and/or may have any other format.

In some demonstrative embodiments, an endpoint close stream response packet (also referred to as "EPCloseStreamResp") may be transmitted by the target device, for example, the WSE device or MA-USB device, e.g., PAL communication unit 131, to the host, for example, the WSE host or the MA-USB host, e.g., PAL communication unit 130.

For example, the EPCloseStreamResp packet may be transmitted from the target MA-USB device to the MA-USB host, e.g., in response to the EPCloseStreamReq packet.

In some demonstrative embodiments, the close stream response packet may include a device handle field including a handle of the USB device for which the response is being returned, e.g., the USB device including the targeted EP.

For example, PAL communication unit 131 may transmit to PAL communication unit 130 an EPCloseStreamResp packet including the handle of USB device 166, e.g., in response to the close streams request packet requesting to close the streams on EP 138.

In some demonstrative embodiments, the endpoint close stream response packet may be transmitted as a management packet. For example, a type field of the endpoint close stream response packet may be set to a value, e.g., "0", indicating the endpoint close stream response packet is a management packet. A subtype field of the endpoint close stream response packet may be set, for example, to a value, e.g., "45", indicating the packet is an endpoint close stream response packet.

In some demonstrative embodiments, the endpoint close stream response may include an indication on whether the endpoint close stream request is successfully completed.

In some demonstrative embodiments, the endpoint close stream response may include a field, e.g., a Status Code field, to carry a value indicating SUCCESS (NO_ERROR) or a value indicating ERROR in closing the streams for the endpoint.

In one example, the MA-USB host or WSE host may transmit an EPCloseStreamReq packet to the MA-USB device or WSE device, which requires the MA-USB device or WSE device to close all the open streams on the target endpoint.

According tot his example, the MA-USB device or WSE device may respond to the EPCloseStreamReq packet with an EPCloseStreamResp packet to inform the MA-USB host or WSE host whether the endpoint close stream request was successfully completed.

Figure 2:
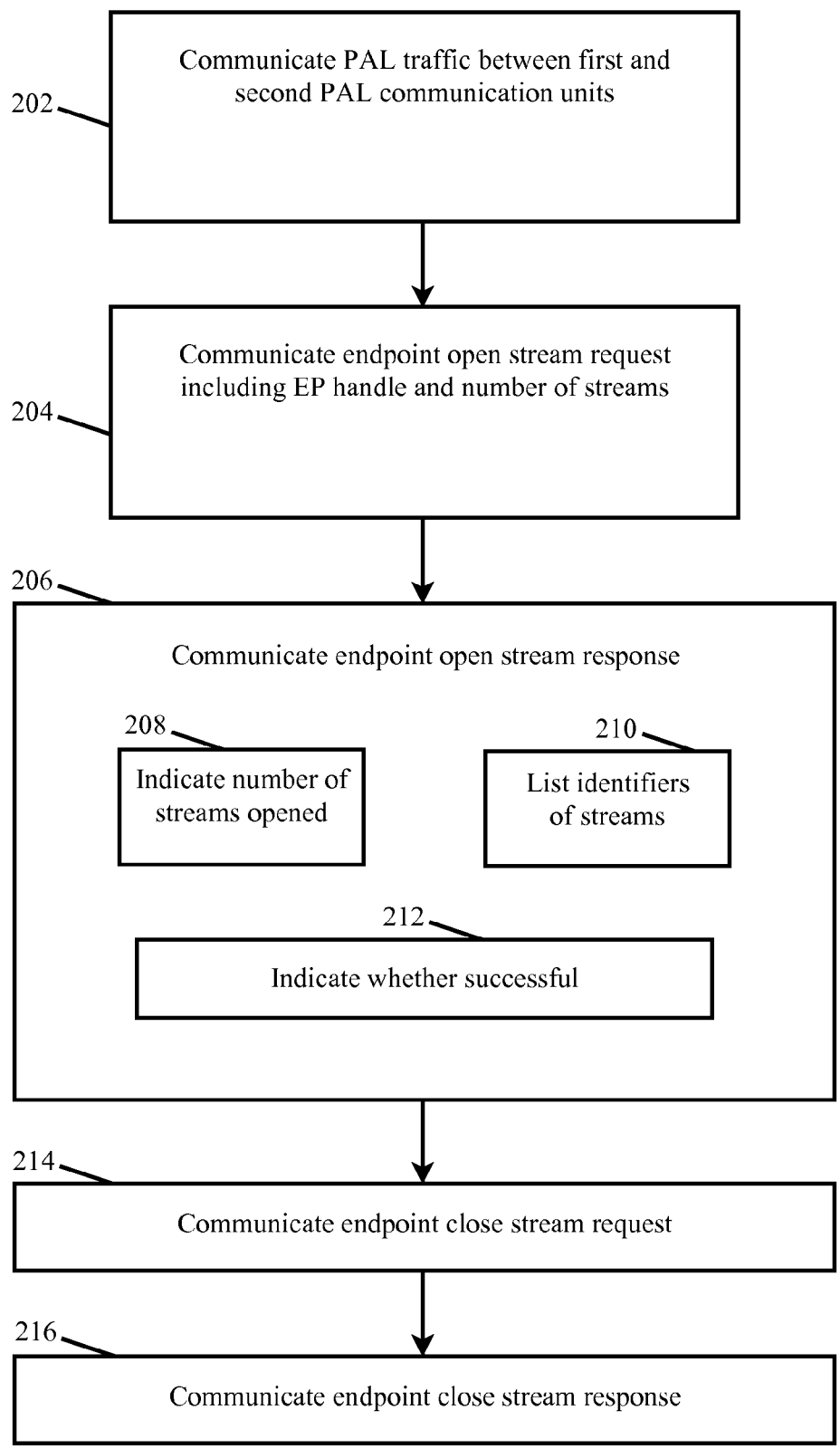
FIG. 2 is a schematic flow-chart illustration of a method of supporting streaming over a Protocol Adaptation Layer (PAL), in accordance with some demonstrative embodiments.

Reference is made to FIG. 2, which schematically illustrates a method of supporting streaming over a Protocol Adaptation Layer (PAL), in accordance with some demonstrative embodiments. In some embodiments, one or more of the operations of the method of FIG. 2 may be performed by a system, e.g., system 100 (FIG. 1); a device, e.g., device 102 (FIG. 1) and/or device 104 (FIG. 1); a PAL communication unit, e.g., PAL communication unit 130 (FIG. 1) and/or PAL communication unit 131 (FIG. 1); a MA-USB host and/or a MA-USB device.

As indicated at block 202, the method may include communicating PAL traffic between a first PAL communication unit and a second PAL communication unit over a communication link. The PAL traffic may include traffic of a PAL connection, over a PAL, between a first device and a second device. The PAL may be above a layer of the communication link. The PAL traffic may include data to be communicated between the first device and one or more endpoints via the second device. For example, PAL communication units 130 and 131 (FIG. 1) may communicate PAL traffic over link 103 between devices 102 and 104 (FIG. 1). The PAL traffic may include data to be communicated between device 102 (FIG. 1) and one or more of endpoints 134, 135, 136, 138 and/or 140 (FIG. 1), e.g., as described above.

As indicated at block 204, the method may include communicating an endpoint open stream request between the first and second PAL communication units over the communication link. The endpoint open stream request may include an endpoint handle of an endpoint and a requested number of endpoint streams to be opened for the endpoint. For example, PAL communication unit 130 (FIG. 1) may transmit to PAL communication unit 131 (FIG. 1) the endpoint open stream request, for example, to open streams on endpoint 138 (FIG. 1), e.g., as described above.

As indicated at block 206, the method may include communicating an endpoint open stream response between the first and second PAL communication units over the communication link. The endpoint open stream response may be communicated in response to the endpoint open stream request. For example, PAL communication unit 131 (FIG. 1) may transmit to PAL communication unit 130 (FIG. 1) the endpoint open stream response in response to the endpoint open stream request, e.g., as described above.

As indicated at block 208, the endpoint open stream response may include a number of streams opened for the endpoint. For example, PAL communication unit 131 (FIG. 1) may transmit to PAL communication unit 130 (FIG. 1) the endpoint open stream response indicating a number of streams opened for endpoint 138 (FIG. 1), e.g., as described above.

As indicated at block 210, the endpoint open stream response may include a list of stream identifiers of streams opened for the endpoint. For example, PAL communication unit 131 (FIG. 1) may transmit to PAL communication unit 130 (FIG. 1) the endpoint open stream response including a list of stream identifiers of streams opened for endpoint 138 (FIG. 1), e.g., as described above.

As indicated at block 212, the endpoint open stream response may include an indication on whether the endpoint open stream request is successfully completed. For example, PAL communication unit 131 (FIG. 1) may transmit to PAL communication unit 130 (FIG. 1) the endpoint open stream response indicating whether the endpoint open stream request for endpoint 138 (FIG. 1) is successfully completed, e.g., as described above.

As indicated at block 214, the method may include communicating an endpoint close stream request between the first and second PAL communication units. The endpoint close stream request may include the endpoint handle of the endpoint. For example, PAL communication unit 130 (FIG. 1) may transmit to PAL communication unit 131 (FIG. 1) an endpoint close stream request including the EP handle of EP 138 (FIG. 1), e.g., as described above.

As indicated at block 216, the method may include communicating an endpoint close stream response between the first and second PAL communication units. The endpoint close stream response may be communicated in response to the endpoint close stream request. The endpoint close stream response may indicate whether all open streams for the endpoint are successfully closed. For example, PAL communication unit 131 (FIG. 1) may transmit to PAL communication unit 130 (FIG. 1) an endpoint close stream response, e.g., in response to the endpoint close stream request, to indicate whether the streams of EP 138 (FIG. 1) successfully closed, e.g., as described above.

Figure 3:
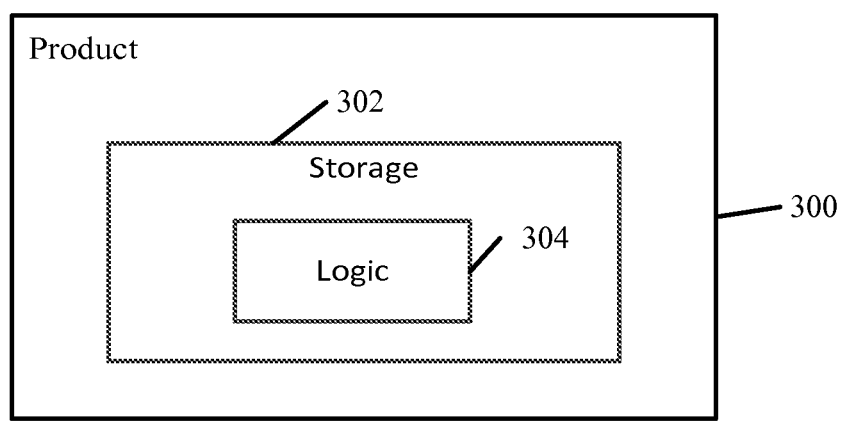
FIG. 3 is a schematic illustration of a product, in accordance with some demonstrative embodiments.

Reference is made to FIG. 3, which schematically illustrates a product of manufacture 400, in accordance with some demonstrative embodiments. Product 300 may include a non-transitory machine-readable storage medium 302 to store logic 304, which may be used, for example, to perform at least part of the functionality of device 102 (FIG. 1), device 104 (FIG. 1), PAL communication unit 130 (FIG. 1), PAL communication unit 131 (FIG. 1), a MA-USB host, and/or MA-USB device, and/or to perform one or more of the operations of the method of FIG. 2. The phrase "non-transitory machine-readable medium" is directed to include all computer-readable media, with the sole exception being a transitory propagating signal.

In some demonstrative embodiments, product 300 and/or machine-readable storage medium 302 may include one or more types of computer-readable storage media capable of storing data, including volatile memory, non-volatile memory, removable or non-removable memory, erasable or non-erasable memory, writeable or re-writeable memory, and the like. For example, machine-readable storage medium 302 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 304 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 304 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising a first Protocol Adaptation Layer (PAL) communication unit to communicate PAL traffic with a second PAL communication unit over a communication link, the PAL traffic comprising traffic of a PAL connection, over a PAL, between a first device and a second device, the PAL is above a layer of the communication link, the PAL traffic comprising data to be communicated between the first device and one or more endpoints via the second device, wherein the first PAL communication unit is to communicate an endpoint open stream request and an endpoint open stream response with the second PAL communication unit over the communication link, the endpoint open stream request including an endpoint handle of an endpoint and a requested number of endpoint streams to be opened for the endpoint, the endpoint open stream response in response to the endpoint open stream request.

Example 2 includes the subject matter of Example 1 and optionally, wherein the endpoint open stream response comprises a number of streams opened for the endpoint.

Example 3 includes the subject matter of Example 1 or 2 and optionally, wherein the endpoint open stream response comprises a list of stream identifiers of streams opened for the endpoint.

Example 4 includes the subject matter of Example 3 and optionally, wherein the stream identifiers are arranged in increasing order.

Example 5 includes the subject matter of any one of Examples 1-4 and optionally, wherein the endpoint open stream response comprises an indication on whether the endpoint open stream request is successfully completed.

Example 6 includes the subject matter of any one of Examples 1-5 and optionally, wherein, if at least one requested stream is not opened for the endpoint, the endpoint open stream response comprises at least one error code indicating a reason for not opening the at least one requested stream.

Example 7 includes the subject matter of any one of Examples 1-6 and optionally, wherein the requested number of endpoint streams is equal to or lesser than a supported number of streams indicated during a session establishment of a session between the first and second PAL communication units.

Example 8 includes the subject matter of any one of Examples 1-7 and optionally, wherein the first PAL communication unit is to communicate a first management packet including the endpoint open stream request and a second management packet including the endpoint open streams response.

Example 9 includes the subject matter of any one of Examples 1-8 and optionally, wherein the first PAL communication unit is to communicate an endpoint close stream request and an endpoint close stream response with the second PAL communication unit over the communication link, the endpoint close stream request including the endpoint handle of the endpoint, the endpoint close stream response in response to the endpoint close stream request, the endpoint close stream response indicating whether all open streams for the endpoint are successfully closed.

Example 10 includes the subject matter of any one of Examples 1-9 and optionally, wherein the first PAL communication unit is to transmit the endpoint open stream request and to receive the endpoint open stream response.

Example 11 includes the subject matter of Example 10 and optionally, wherein the first PAL communication unit comprises a PAL host.

Example 12 includes the subject matter of Example 11 and optionally, wherein the PAL host comprises a Wireless-Gigabit (WiGig) Serial Extension (WSE) host, a Wi-Fi Serial Bus (WSB) host or a Media Agnostic USB (MA-USB) host.

Example 13 includes the subject matter of any one of Examples 1-9 and optionally, wherein the first PAL communication unit is to receive the endpoint open stream request and to transmit the endpoint open stream response.

Example 14 includes the subject matter of Example 13 and optionally, wherein the first PAL communication unit comprises a PAL device.

Example 15 includes the subject matter of Example 14 and optionally, wherein the PAL device comprises a Wireless-Gigabit (WiGig) Serial Extension (WSE) device, a Wi-Fi Serial Bus (WSB) device or a Media Agnostic USB (MA-USB) device.

Example 16 includes the subject matter of any one of Examples 1-15 and optionally, wherein the endpoint streams comprise a plurality of parallel streams.

Example 17 includes the subject matter of any one of Examples 1-16 and optionally, wherein the endpoint comprises a Super-Speed (SS) bulk endpoint.

Example 18 includes the subject matter of any one of Examples 1-17 and optionally, wherein the endpoint comprises a Universal-Serial-Bus (USB) endpoint.

Example 19 includes the subject matter of any one of Examples 1-18 and optionally, wherein the communication link comprises a MAC layer link.

Example 20 includes the subject matter of Example 19 and optionally, wherein the MAC layer link comprises at least one link selected from the group consisting of a wireless communication link and a wired communication link.

Example 21 includes the subject matter of Example 20 and optionally, wherein the wireless communication link comprises a wireless gigabit (WiGig) link or a Wireless Fidelity (Wi-Fi) link.

Example 22 includes a system comprising at least one communication device including a network interface to communicate over a communication link; and a first Protocol Adaptation Layer (PAL) communication unit to communicate PAL traffic with a second PAL communication unit over the communication link, the PAL traffic comprising traffic of a PAL connection, over a PAL, between a first device and a second device, the PAL is above a layer of the communication link, the PAL traffic comprising data to be communicated between the first device and one or more endpoints via the second device, wherein the first PAL communication unit is to communicate an endpoint open stream request and an endpoint open stream response with the second PAL communication unit over the communication link, the endpoint open stream request including an endpoint handle of an endpoint and a requested number of endpoint streams to be opened for the endpoint, the endpoint open stream response in response to the endpoint open stream request.

Example 23 includes the subject matter of Example 22 and optionally, wherein the endpoint open stream response comprises a number of streams opened for the endpoint.

Example 24 includes the subject matter of Example 22 or 23 and optionally, wherein the endpoint open stream response comprises a list of stream identifiers of streams opened for the endpoint.

Example 25 includes the subject matter of Example 24 and optionally, wherein the stream identifiers are arranged in increasing order.

Example 26 includes the subject matter of any one of Examples 22-25 and optionally, wherein the endpoint open stream response comprises an indication on whether the endpoint open stream request is successfully completed.

Example 27 includes the subject matter of any one of Examples 22-26 and optionally, wherein, if at least one requested stream is not opened for the endpoint, the endpoint open stream response comprises at least one error code indicating a reason for not opening the at least one requested stream.

Example 28 includes the subject matter of any one of Examples 22-27 and optionally, wherein the requested number of endpoint streams is equal to or lesser than a supported number of streams indicated during a session establishment of a session between the first and second PAL communication units.

Example 29 includes the subject matter of any one of Examples 22-28 and optionally, wherein the first PAL communication unit is to communicate a first management packet including the endpoint open stream request and a second management packet including the endpoint open streams response.

Example 30 includes the subject matter of any one of Examples 22-29 and optionally, wherein the first PAL communication unit is to communicate an endpoint close stream request and an endpoint close stream response with the second PAL communication unit over the communication link, the endpoint close stream request including the endpoint handle of the endpoint, the endpoint close stream response in response to the endpoint close stream request, the endpoint close stream response indicating whether all open streams for the endpoint are successfully closed.

Example 31 includes the subject matter of any one of Examples 22-30 and optionally, wherein the first PAL communication unit is to transmit the endpoint open stream request and to receive the endpoint open stream response.

Example 32 includes the subject matter of Example 31 and optionally, wherein the first PAL communication unit comprises a PAL host.

Example 33 includes the subject matter of Example 32 and optionally, wherein the PAL host comprises a Wireless-Gigabit (WiGig) Serial Extension (WSE) host, a Wi-Fi Serial Bus (WSB) host or a Media Agnostic USB (MA-USB) host.

Example 34 includes the subject matter of any one of Examples 22-30 and optionally, wherein the first PAL communication unit is to receive the endpoint open stream request and to transmit the endpoint open stream response.

Example 35 includes the subject matter of Example 34 and optionally, wherein the first PAL communication unit comprises a PAL device.

Example 36 includes the subject matter of Example 35 and optionally, wherein the PAL device comprises a Wireless-Gigabit (WiGig) Serial Extension (WSE) device, a Wi-Fi Serial Bus (WSB) device or a Media Agnostic USB (MA-USB) device.

Example 37 includes the subject matter of any one of Examples 22-36 and optionally, wherein the endpoint streams comprise a plurality of parallel streams.

Example 38 includes the subject matter of any one of Examples 22-37 and optionally, wherein the endpoint comprises a Super-Speed (SS) bulk endpoint.

Example 39 includes the subject matter of any one of Examples 22-38 and optionally, wherein the endpoint comprises a Universal-Serial-Bus (USB) endpoint.

Example 40 includes the subject matter of any one of Examples 22-39 and optionally, wherein the communication link comprises a MAC layer link.

Example 41 includes the subject matter of Example 40 and optionally, wherein the MAC layer link comprises at least one link selected from the group consisting of a wireless communication link and a wired communication link.

Example 42 includes the subject matter of Example 41 and optionally, wherein the wireless communication link comprises a wireless gigabit (WiGig) link or a Wireless Fidelity (Wi-Fi) link.

Example 43 includes a method comprising communicating Protocol Adaptation Layer (PAL) traffic between a first PAL communication unit and a second PAL communication unit over a communication link, the PAL traffic comprising traffic of a PAL connection, over a PAL, between a first device and a second device, the PAL is above a layer of the communication link, the PAL traffic comprising data to be communicated between the first device and one or more endpoints via the second device; and communicating an endpoint open stream request and an endpoint open stream response between the first and second PAL communication units over the communication link, the endpoint open stream request including an endpoint handle of an endpoint and a requested number of endpoint streams to be opened for the endpoint, the endpoint open stream response in response to the endpoint open stream request.

Example 44 includes the subject matter of Example 43 and optionally, wherein the endpoint open stream response comprises a number of streams opened for the endpoint.

Example 45 includes the subject matter of Example 43 or 44 and optionally, wherein the endpoint open stream response comprises a list of stream identifiers of streams opened for the endpoint.

Example 46 includes the subject matter of Example 45 and optionally, wherein the stream identifiers are arranged in increasing order.

Example 47 includes the subject matter of any one of Examples 43-46 and optionally, wherein the endpoint open stream response comprises an indication on whether the endpoint open stream request is successfully completed.

Example 48 includes the subject matter of any one of Examples 43-47 and optionally, wherein, if at least one requested stream is not opened for the endpoint, the endpoint open stream response comprises at least one error code indicating a reason for not opening the at least one requested stream.

Example 49 includes the subject matter of any one of Examples 43-48 and optionally, wherein the requested number of endpoint streams is equal to or lesser than a supported number of streams indicated during a session establishment of a session between the first and second PAL communication units.

Example 50 includes the subject matter of any one of Examples 43-49 and optionally, comprising communicating a first management packet including the endpoint open stream request and a second management packet including the endpoint open streams response.

Example 51 includes the subject matter of any one of Examples 43-50 and optionally, comprising communicating an endpoint close stream request and an endpoint close stream response with the second PAL communication unit over the communication link, the endpoint close stream request including the endpoint handle of the endpoint, the endpoint close stream response in response to the endpoint close stream request, the endpoint close stream response indicating whether all open streams for the endpoint are successfully closed.

Example 52 includes the subject matter of any one of Examples 43-51 and optionally, comprising transmitting the endpoint open stream request and receiving the endpoint open stream response.

Example 53 includes the subject matter of Example 52 and optionally, wherein the first PAL communication unit comprises a PAL host.

Example 54 includes the subject matter of Example 53 and optionally, wherein the PAL host comprises a Wireless-Gigabit (WiGig) Serial Extension (WSE) host, a Wi-Fi Serial Bus (WSB) host or a Media Agnostic USB (MA-USB) host.

Example 55 includes the subject matter of any one of Examples 43-51 and optionally, comprising receiving the endpoint open stream request and transmitting the endpoint open stream response.

Example 56 includes the subject matter of Example 55 and optionally, wherein the first PAL communication unit comprises a PAL device.

Example 57 includes the subject matter of Example 56 and optionally, wherein the PAL device comprises a Wireless-Gigabit (WiGig) Serial Extension (WSE) device, a Wi-Fi Serial Bus (WSB) device or a Media Agnostic USB (MA-USB) device.

Example 58 includes the subject matter of any one of Examples 43-57 and optionally, wherein the endpoint streams comprise a plurality of parallel streams.

Example 59 includes the subject matter of any one of Examples 43-58 and optionally, wherein the endpoint comprises a Super-Speed (SS) bulk endpoint.

Example 60 includes the subject matter of any one of Examples 43-59 and optionally, wherein the endpoint comprises a Universal-Serial-Bus (USB) endpoint.

Example 61 includes the subject matter of any one of Examples 43-60 and optionally, wherein the communication link comprises a MAC layer link.

Example 62 includes the subject matter of Example 61 and optionally, wherein the MAC layer link comprises at least one link selected from the group consisting of a wireless communication link and a wired communication link.

Example 63 includes the subject matter of Example 62 and optionally, wherein the wireless communication link comprises a wireless gigabit (WiGig) link or a Wireless Fidelity (Wi-Fi) link.

Example 64 includes a product including a non-transitory storage medium having stored thereon instructions that, when executed by a machine, result in communicating Protocol Adaptation Layer (PAL) traffic between a first PAL communication unit and a second PAL communication unit over a communication link, the PAL traffic comprising traffic of a PAL connection, over a PAL, between a first device and a second device, the PAL is above a layer of the communication link, the PAL traffic comprising data to be communicated between the first device and one or more endpoints via the second device; and communicating an endpoint open stream request and an endpoint open stream response between the first and second PAL communication units over the communication link, the endpoint open stream request including an endpoint handle of an endpoint and a requested number of endpoint streams to be opened for the endpoint, the endpoint open stream response in response to the endpoint open stream request.

Example 65 includes the subject matter of Example 64 and optionally, wherein the endpoint open stream response comprises a number of streams opened for the endpoint.

Example 66 includes the subject matter of Example 64 or 65 and optionally, wherein the endpoint open stream response comprises a list of stream identifiers of streams opened for the endpoint.

Example 67 includes the subject matter of Example 66 and optionally, wherein the stream identifiers are arranged in increasing order.

Example 68 includes the subject matter of any one of Examples 64-67 and optionally, wherein the endpoint open stream response comprises an indication on whether the endpoint open stream request is successfully completed.

Example 69 includes the subject matter of any one of Examples 64-68 and optionally, wherein, if at least one requested stream is not opened for the endpoint, the endpoint open stream response comprises at least one error code indicating a reason for not opening the at least one requested stream.

Example 70 includes the subject matter of any one of Examples 64-69 and optionally, wherein the requested number of endpoint streams is equal to or lesser than a supported number of streams indicated during a session establishment of a session between the first and second PAL communication units.

Example 71 includes the subject matter of any one of Examples 64-70 and optionally, wherein the instructions result in communicating a first management packet including the endpoint open stream request and a second management packet including the endpoint open streams response.

Example 72 includes the subject matter of any one of Examples 64-71 and optionally, wherein the instructions result in communicating an endpoint close stream request and an endpoint close stream response with the second PAL communication unit over the communication link, the endpoint close stream request including the endpoint handle of the endpoint, the endpoint close stream response in response to the endpoint close stream request, the endpoint close stream response indicating whether all open streams for the endpoint are successfully closed.

Example 73 includes the subject matter of any one of Examples 64-72 and optionally, wherein the instructions result in transmitting the endpoint open stream request and receiving the endpoint open stream response.

Example 74 includes the subject matter of Example 73 and optionally, wherein the first PAL communication unit comprises a PAL host.

Example 75 includes the subject matter of Example 74 and optionally, wherein the PAL host comprises a Wireless-Gigabit (WiGig) Serial Extension (WSE) host, a Wi-Fi Serial Bus (WSB) host or a Media Agnostic USB (MA-USB) host.

Example 76 includes the subject matter of any one of Examples 64-72 and optionally, wherein the instructions result in receiving the endpoint open stream request and transmitting the endpoint open stream response.

Example 77 includes the subject matter of Example 76 and optionally, wherein the first PAL communication unit comprises a PAL device.

Example 78 includes the subject matter of Example 77 and optionally, wherein the PAL device comprises a Wireless-Gigabit (WiGig) Serial Extension (WSE) device, a Wi-Fi Serial Bus (WSB) device or a Media Agnostic USB (MA-USB) device.

Example 79 includes the subject matter of any one of Examples 64-78 and optionally, wherein the endpoint streams comprise a plurality of parallel streams.

Example 80 includes the subject matter of any one of Examples 64-79 and optionally, wherein the endpoint comprises a Super-Speed (SS) bulk endpoint.

Example 81 includes the subject matter of any one of Examples 64-80 and optionally, wherein the endpoint comprises a Universal-Serial-Bus (USB) endpoint.

Example 82 includes the subject matter of any one of Examples 64-81 and optionally, wherein the communication link comprises a MAC layer link.

Example 83 includes the subject matter of Example 82 and optionally, wherein the MAC layer link comprises at least one link selected from the group consisting of a wireless communication link and a wired communication link.

Example 84 includes the subject matter of Example 83 and optionally, wherein the wireless communication link comprises a wireless gigabit (WiGig) link or a Wireless Fidelity (Wi-Fi) link.

Example 85 includes an apparatus comprising means for communicating Protocol Adaptation Layer (PAL) traffic between a first PAL communication unit and a second PAL communication unit over a communication link, the PAL traffic comprising traffic of a PAL connection, over a PAL, between a first device and a second device, the PAL is above a layer of the communication link, the PAL traffic comprising data to be communicated between the first device and one or more endpoints via the second device; and means for communicating an endpoint open stream request and an endpoint open stream response between the first and second PAL communication units over the communication link, the endpoint open stream request including an endpoint handle of an endpoint and a requested number of endpoint streams to be opened for the endpoint, the endpoint open stream response in response to the endpoint open stream request.

Example 86 includes the subject matter of Example 85 and optionally, wherein the endpoint open stream response comprises a number of streams opened for the endpoint.

Example 87 includes the subject matter of Example 85 or 86 and optionally, wherein the endpoint open stream response comprises a list of stream identifiers of streams opened for the endpoint.

Example 88 includes the subject matter of Example 87 and optionally, wherein the stream identifiers are arranged in increasing order.

Example 89 includes the subject matter of any one of Examples 85-88 and optionally, wherein the endpoint open stream response comprises an indication on whether the endpoint open stream request is successfully completed.

Example 90 includes the subject matter of any one of Examples 85-89 and optionally, wherein, if at least one requested stream is not opened for the endpoint, the endpoint open stream response comprises at least one error code indicating a reason for not opening the at least one requested stream.

Example 91 includes the subject matter of any one of Examples 85-90 and optionally, wherein the requested number of endpoint streams is equal to or lesser than a supported number of streams indicated during a session establishment of a session between the first and second PAL communication units.

Example 92 includes the subject matter of any one of Examples 85-91 and optionally, comprising means for communicating a first management packet including the endpoint open stream request and a second management packet including the endpoint open streams response.

Example 93 includes the subject matter of any one of Examples 85-92 and optionally, comprising means for communicating an endpoint close stream request and an endpoint close stream response with the second PAL communication unit over the communication link, the endpoint close stream request including the endpoint handle of the endpoint, the endpoint close stream response in response to the endpoint close stream request, the endpoint close stream response indicating whether all open streams for the endpoint are successfully closed.

Example 94 includes the subject matter of any one of Examples 85-93 and optionally, comprising means for transmitting the endpoint open stream request and receiving the endpoint open stream response.

Example 95 includes the subject matter of Example 94 and optionally, wherein the first PAL communication unit comprises a PAL host.

Example 96 includes the subject matter of Example 95 and optionally, wherein the PAL host comprises a Wireless-Gigabit (WiGig) Serial Extension (WSE) host, a Wi-Fi Serial Bus (WSB) host or a Media Agnostic USB (MA-USB) host.

Example 97 includes the subject matter of any one of Examples 85-93 and optionally, comprising means for receiving the endpoint open stream request and transmitting the endpoint open stream response.

Example 98 includes the subject matter of Example 97 and optionally, wherein the first PAL communication unit comprises a PAL device.

Example 99 includes the subject matter of Example 98 and optionally, wherein the PAL device comprises a Wireless-Gigabit (WiGig) Serial Extension (WSE) device, a Wi-Fi Serial Bus (WSB) device or a Media Agnostic USB (MA-USB) device.

Example 100 includes the subject matter of any one of Examples 85-99 and optionally, wherein the endpoint streams comprise a plurality of parallel streams.

Example 101 includes the subject matter of any one of Examples 85-100 and optionally, wherein the endpoint comprises a Super-Speed (SS) bulk endpoint.

Example 102 includes the subject matter of any one of Examples 85-101 and optionally, wherein the endpoint comprises a Universal-Serial-Bus (USB) endpoint.

Example 103 includes the subject matter of any one of Examples 85-102 and optionally, wherein the communication link comprises a MAC layer link.

Example 104 includes the subject matter of Example 103 and optionally, wherein the MAC layer link comprises at least one link selected from the group consisting of a wireless communication link and a wired communication link.

Example 105 includes the subject matter of Example 104 and optionally, wherein the wireless communication link comprises a wireless gigabit (WiGig) link or a Wireless Fidelity (Wi-Fi) link.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many variations, modifications, substitutions, changes, additions, improvements and equivalents may occur to those skilled in the art. It is, therefore, to be understood that the appended claims are intended to cover all such modifications and changes as fall within the true spirit of the invention.

What is claimed is:

1. An apparatus of a Media-agnostic (MA) Universal Serial Bus (USB) device of an MA USB Protocol Adaptation Layer (PAL) to connect between a USB device and a USB host, the apparatus comprising:
    a memory; and
    a processor to process communications of a PAL connection, over the PAL, between the MA USB device and an MA USB host, said PAL is above a data link layer, the processor configured to cause the MA USB device to:
        process an endpoint (EP) open streams request (EPOpenStreamReq) from the MA USB host, the EP open streams request comprising a device handle of the USB device, an EP handle of an EP on the USB device, and an indication of a requested number of streams to be opened for the EP; and
        transmit an EP open streams response (EPOpenStreamResp) to the MA USB host, the EP open streams response comprising a status code field to indicate whether the EP open streams request is successfully completed, the device handle of the USB device, a number-of-streams field to indicate a number of streams successfully opened, and a list of stream identifiers (IDs) of the streams successfully opened.

2. The apparatus of claim 1, wherein said processor is configured to cause said MA USB device to set said status code field to a success indication, and to set said number-of-streams field to a same value of the requested number of streams.

3. The apparatus of claim 1, wherein said processor is configured to cause said MA USB device to set said status code field to a value indicating insufficient resources, when the requested number of streams is greater than a number of streams supported by MA USB device.

4. The apparatus of claim 1, wherein the list of stream IDs is in increasing order.

5. The apparatus of claim 4, wherein the list of stream IDs is concatenated in 16-bit increments.

6. The apparatus of claim 1, wherein the processor is configured to cause the MA USB device to:
    process an EP close streams request (EPCloseStreamReq) from the MA USB host to request to close all open streams on the EP, the EP close streams request comprising the device handle of said USB device, and the EP handle of the EP; and
    transmit an EP close streams response (EPCloseStreamResp) to the MA USB host, the EP close streams response comprising the device handle of the USB device, and an indication whether the EP close streams request is successfully completed.

7. The apparatus of claim 1, wherein the EP comprises a Super Speed (SS) bulk EP.

8. The apparatus of claim 1, wherein the MA USB PAL is configured to enable connectivity between a USB host and one or more USB devices.

9. The apparatus of claim 1, wherein the processor is configured to control the PAL connection, over the PAL, between the MA USB host and the MA USB device.

10. The apparatus of claim 1 comprising a Media Access Control (MAC) component and a Physical Layer (PHY) component.

11. The apparatus of claim 1 comprising a radio, and a phase array antenna.

12. The apparatus of claim 1 comprising a network interface.

13. The apparatus of claim 1 comprising at least one antenna.

14. A product comprising one or more tangible computer-readable non-transitory storage media comprising computer-executable instructions operable to, when executed by at least one computer processor, enable the at least one computer processor to implement operations at a Media-agnostic (MA) Universal Serial Bus (USB) device of an MA USB Protocol Adaptation Layer (PAL) to connect between a USB device and a USB host, the MA USB device to process communications of a PAL connection, over the PAL, between the MA USB device and an MA USB host, said PAL is above a data link layer, the operations comprising:
    processing an endpoint (EP) open streams request (EPOpenStreamReq) from the MA USB host, the EP open streams request comprising a device handle of the USB device, an EP handle of an EP on the USB device, and an indication of a requested number of streams to be opened for the EP; and
    transmitting an EP open streams response (EPOpenStreamResp) to the MA USB host, the EP open streams response comprising a status code field to indicate whether the EP open streams request is successfully completed, the device handle of the USB device, a number-of-streams field to indicate a number of streams successfully opened, and a list of stream identifiers (IDs) of the streams successfully opened.

15. The product of claim 14, wherein the operations comprise setting said status code field to a success indication, and setting said number-of-streams field to a same value of the requested number of streams.

16. The product of claim 14, wherein the operations comprise setting said status code field to a value indicating insufficient resources, when the requested number of streams is greater than a number of streams supported by MA USB device.

17. The product of claim 14, wherein the list of stream IDs is in increasing order.

18. The product of claim 17, wherein the list of stream IDs is concatenated in 16-bit increments.

19. The product of claim 14, wherein the operations comprise:
- processing an EP close streams request (EPCloseStreamReq) from the MA USB host to request to close all open streams on the EP, the EP close streams request comprising the device handle of said USB device, and the EP handle of the EP; and
- transmitting an EP close streams response (EPCloseStreamResp) to the MA USB host, the EP close streams response comprising the device handle of the USB device, and an indication whether the EP close streams request is successfully completed.

20. The product of claim 14, wherein the EP comprises a Super Speed (SS) bulk EP.

21. The product of claim 14, wherein the MA USB PAL is configured to enable connectivity between a USB host and one or more USB devices.

22. The product of claim 14, wherein the operations comprise controlling the PAL connection, over the PAL, between the MA USB host and the MA USB device.

\* \* \* \* \*